United States Patent
Zhang

(10) Patent No.: US 12,341,365 B2
(45) Date of Patent: Jun. 24, 2025

(54) REDUCED STANDBY CURRENT IN A MULTI-BATTERY WEARABLE DEVICE

(71) Applicant: Snap Inc., Santa Monica, CA (US)

(72) Inventor: Zhibin Zhang, Venice, CA (US)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 18/739,108

(22) Filed: Jun. 10, 2024

(65) Prior Publication Data

US 2024/0332993 A1   Oct. 3, 2024

Related U.S. Application Data

(63) Continuation of application No. 18/047,200, filed on Oct. 17, 2022, now Pat. No. 12,027,895, which is a continuation of application No. 16/948,985, filed on Oct. 8, 2020, now Pat. No. 11,476,683, which is a continuation of application No. 16/175,484, filed on Oct. 30, 2018, now Pat. No. 10,833,514.

(60) Provisional application No. 62/578,944, filed on Oct. 30, 2017.

(51) Int. Cl.
*H02J 7/00* (2006.01)
*H01M 10/44* (2006.01)

(52) U.S. Cl.
CPC ......... *H02J 7/0024* (2013.01); *H01M 10/441* (2013.01); *H02J 7/0029* (2013.01); *H02J 7/007* (2013.01); *H01M 2220/30* (2013.01)

(58) Field of Classification Search
USPC ........................................................ 320/107
See application file for complete search history.

(56) References Cited

U.S. PATENT DOCUMENTS

| 10,833,514 | B1 | 11/2020 | Zhang | |
|---|---|---|---|---|
| 2008/0072859 | A1* | 3/2008 | Esaka | H02J 7/0019 320/117 |
| 2011/0202192 | A1* | 8/2011 | Kempton | H02J 3/008 320/109 |
| 2011/0241623 | A1 | 10/2011 | Wade et al. | |
| 2011/0302078 | A1* | 12/2011 | Failing | B60L 53/126 700/297 |
| 2013/0307489 | A1* | 11/2013 | Kusch | B60L 58/20 320/167 |

(Continued)

OTHER PUBLICATIONS

"U.S. Appl. No. 16/175,484, Examiner Interview Summary mailed Apr. 13, 2020", 3 pgs.

(Continued)

*Primary Examiner* — Mohammed Alam
(74) *Attorney, Agent, or Firm* — SCHWEGMAN LUNDBERG & WOESSNER, P.A.

(57) ABSTRACT

Disclosed are embodiments to provide a multi-battery energy storage device. One embodiment comprises a first battery and a second battery, with a first circuit branch coupling a positive side of the first battery to a positive side of the second battery, a second circuit branch coupling a positive side of the first battery to a negative side of the second battery, a third circuit branch coupling the negative side of the first battery to the negative side of the second battery, and multiple switchable devices configured to control flow of current through corresponding branches. Other embodiments comprise other configurations and operations.

20 Claims, 10 Drawing Sheets

(56) References Cited

U.S. PATENT DOCUMENTS

| | | | |
|---|---|---|---|
| 2015/0222132 A1* | 8/2015 | Shikatani | H01M 10/0445 320/117 |
| 2016/0288746 A1 | 10/2016 | Namuduri et al. | |
| 2017/0187184 A1* | 6/2017 | Nakayama | H02J 7/0024 |
| 2017/0301943 A1* | 10/2017 | Cho | H02J 7/0068 |
| 2018/0043789 A1 | 2/2018 | Goetz | |
| 2018/0167002 A1* | 6/2018 | Frampton | H02P 9/14 |
| 2018/0358837 A1* | 12/2018 | Sakakibara | H02J 7/00714 |
| 2019/0100111 A1 | 4/2019 | Liu et al. | |
| 2019/0115628 A1 | 4/2019 | Ho | |
| 2020/0328478 A1* | 10/2020 | Nozawa | B60L 3/0046 |
| 2021/0167613 A1 | 6/2021 | Zhang | |
| 2023/0067925 A1 | 3/2023 | Zhang | |

OTHER PUBLICATIONS

"U.S. Appl. No. 16/175,484, Non Final Office Action mailed Jan. 13, 2020", 9 pgs.

"U.S. Appl. No. 16/175,484, Notice of Allowance mailed Jul. 1, 2020", 7 pgs.

"U.S. Appl. No. 16/175,484, Response filed Apr. 8, 2020 to Non Final Office Action mailed Jan. 13, 2020", 10 pgs.

"U.S. Appl. No. 16/948,985, Non Final Office Action mailed Dec. 27, 2021", 9 pgs.

"U.S. Appl. No. 16/948,985, Notice of Allowance mailed Jun. 10, 2022", 9 pgs.

"U.S. Appl. No. 16/948,985, Preliminary Amendment filed Feb. 19, 2021", 7 pgs.

"U.S. Appl. No. 16/948,985, Response filed May 27, 2022 to Non Final Office Action mailed Dec. 27, 2021", 9 pgs.

"U.S. Appl. No. 18/047,200, Non Final Office Action mailed Nov. 2, 2023", 17 pgs.

"U.S. Appl. No. 18/047,200, Notice of Allowance mailed Feb. 27, 2024", 17 pgs.

"U.S. Appl. No. 18/047,200, Preliminary Amendment filed Oct. 21, 2022", 7 pgs.

"U.S. Appl. No. 18/047,200, Response filed Feb. 2, 2024 to Non Final Office Action mailed Nov. 2, 2023", 8 pgs.

"U.S. Appl. No. 18/047,200, Response filed Oct. 6, 2023 to Restriction Requirement mailed Aug. 7, 2023", 7 pgs.

"U.S. Appl. No. 18/047,200, Restriction Requirement mailed Aug. 7, 2023", 7 pgs.

U.S. Appl. No. 16/175,484 U.S. Pat. No. 10,833,514, filed Oct. 30, 2018, Reduced Standby Current in a Multi-Battery Wearable Device.

U.S. Appl. No. 16/948,985 U.S. Pat. No. 11,476,683, filed Oct. 8, 2020, Reduced Standby Current in a Multi-Battery Wearable Device.

U.S. Appl. No. 18/047,200, filed Oct. 17, 2022, Reduced Standby Current in a Multi-Battery Wearable Device.

* cited by examiner

REDUCED STANDBY CURRENT IN A MULTI-BATTERY WEARABLE DEVICE

CLAIM OF PRIORITY

This application is a continuation of U.S. patent application Ser. No. 18/047,200, filed on Oct. 17, 2022, which is a continuation of U.S. patent application Ser. No. 16/948,985, filed on Oct. 8, 2020, which is a continuation of U.S. patent application Ser. No. 16/175,484, filed on Oct. 30, 2018, now issued as U.S. Pat. No. 10,833,514, which claims the benefit of priority to U.S. Provisional Application Ser. No. 62/578,944, filed on Oct. 30, 2017, each of which are incorporated herein by reference in their entireties.

TECHNICAL FIELD

The present disclosure generally relates to the technical field of battery management. In particular, the present disclosure provides for a switchable battery path to optimize use of two batteries.

BACKGROUND

Battery life is an important factor in the use of mobile devices. When battery levels become low, users may alter their use of their mobile device. For example, they may not participate as activity on social networks, may not capture as many images, and reduce their use of the mobile device in other ways. Therefore, improved methods of managing battery life are desirable.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Embodiments include a multi-battery energy device that supports an operable and a standby state of a device. The multi-battery energy device provides for reduced current consumption during the standby state relative to other devices. In some embodiments, the multi-battery energy device includes at least three switches that provide for at least two batteries to be configured to operate either serially or individually. During the operate state, the batteries are switched to run in serial. During the standby state, the multi-battery energy device is switched to provide standby current via only one battery. The battery with the highest energy state may be selected to provide energy during the standby state. If the relative energy state of the two batteries changes while the device is in the standby state, the battery configuration may be switched to favor the highest energy battery. By switching from a serial battery configuration during operation to a single battery configuration at standby, current draw during standby is reduced. Furthermore, problems associated with parallel battery configurations are eliminated. The disclosed solutions provide a current limiter design that is operable with a multi-battery implementation, while providing for charging and discharging of the batteries with a low-level current. These proposed solutions also help to reduce quiescent current.

In some implementations, a battery capacity may be relatively small. Thus, it may be challenging to identify off-the-shelf components to safely charge and discharge this battery pack. This problem is further amplified in a multi-battery pack configuration. For example, in implementation using two battery packs, balancing charging and discharging of current between the two packs may be a challenge. If a device discharges excessively, there is a risk of damage the pack. If a battery is charged excessively, the life of the battery may suffer. If the batteries do not maintain a power balance, one battery may be depleted before the other, and thus energy stored in the remaining battery may not be recoverable. Battery life may also be adversely affected by failure to maintain balance. Thus, the disclosed methods, systems, and devices seek to solve these problems as described in more detail below.

Figure 1:
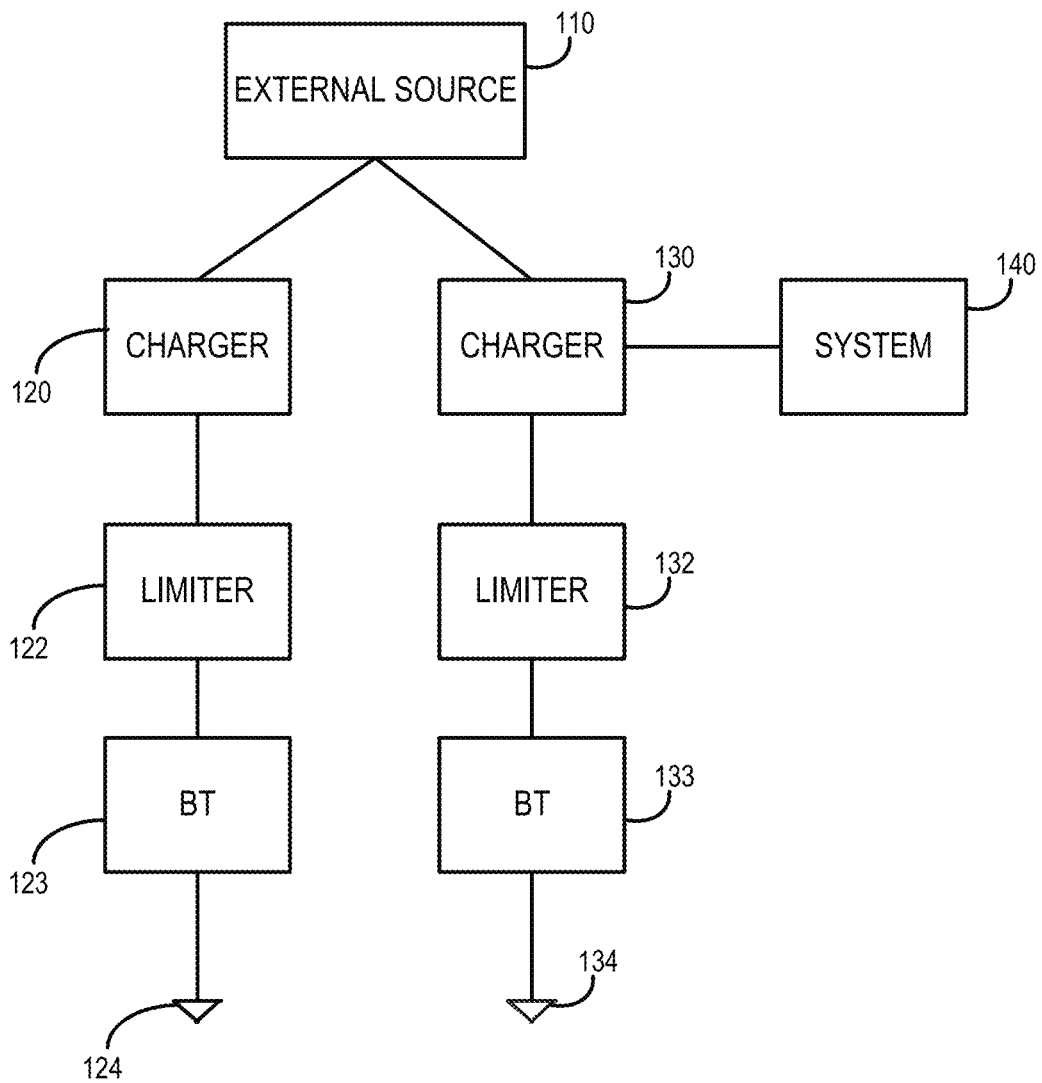
FIG. 1 is a block diagram of an example embodiment of a circuit design including two batteries connected in parallel in accordance with some embodiments

FIG. 1 is a block diagram of an example embodiment of a circuit design including two batteries connected in parallel. As shown, the embodiment in FIG. 1 includes an external source 110, chargers 120 and 130, system 140, limiters 122 and 132, first battery 123, second battery 133, and ground connections 124 and 134. As shown, the external source 110 is connected to both the first charger 120 and the second charger 130. The chargers may have different strengths matching the performance of the different batteries 123 and 133. For example, first battery 123 may have a cell strength lower than a cell strength of second battery 133, and the corresponding first and second chargers may be configured so that first charger 120 coupled to first battery 123 has a lower voltage and second charger 130 coupled to second battery 133 has a higher voltage (e.g. compared with the voltage of the first charger). The first and second batteries may each have associated circuitry for measuring the stored energy within the battery (e.g. a "fuel gauge"). Such circuitry may be used for measurements in various operations described below and may provide data to processors of a device as part of device monitoring and operations. Similarly, each battery may have associated circuitry for monitoring temperature (e.g. negative temperature coefficient ("NTC") using a thermistor) for further evaluation of circuit performance and operation. As described above, the use of two batteries enables certain performance based on one battery (e.g. higher performance), and certain performance based on a second battery (e.g. lower standby power usage). The parallel operation of batteries 123 and 133 enable power to system 140 (e.g. a wearable device such as AR glasses, a camera, a phone, or other such devices).

Figure 2:
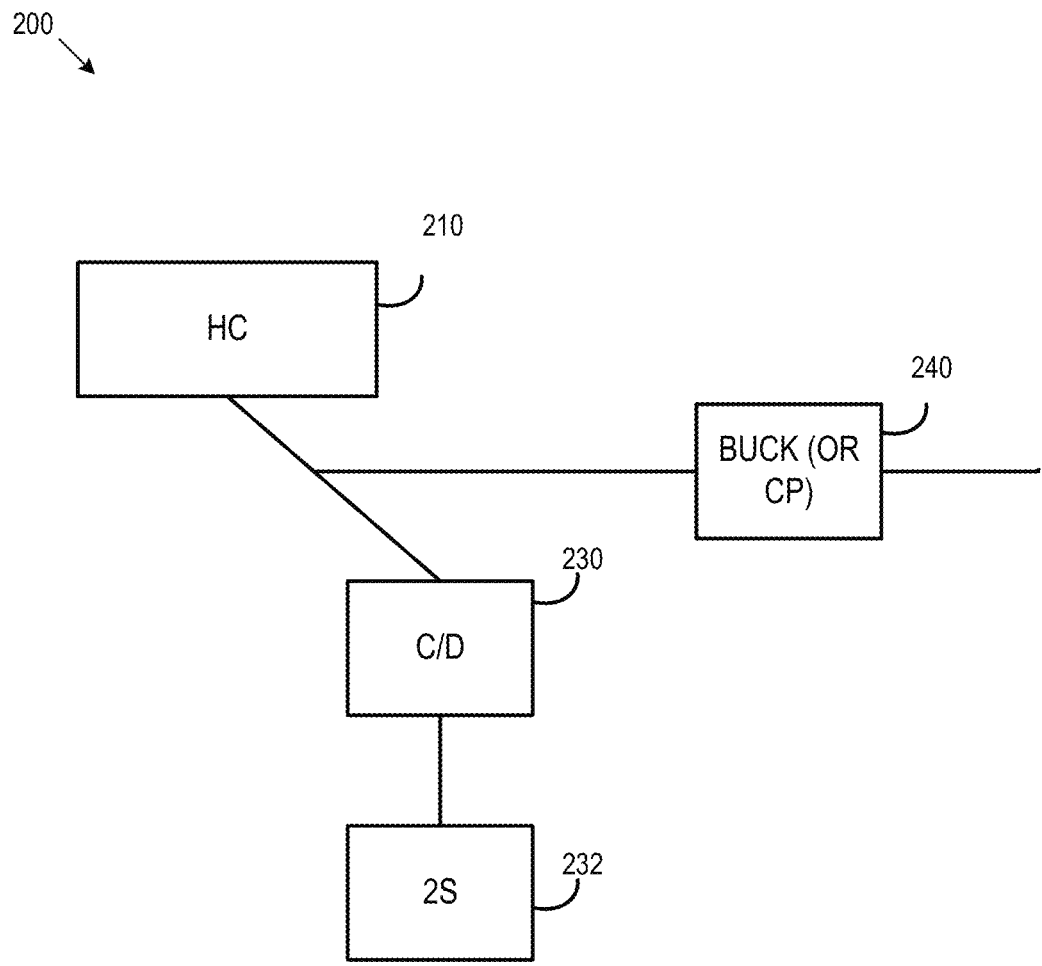
FIG. 2 shows a block diagram of an example system in accordance with some embodiments.
Figure 3:
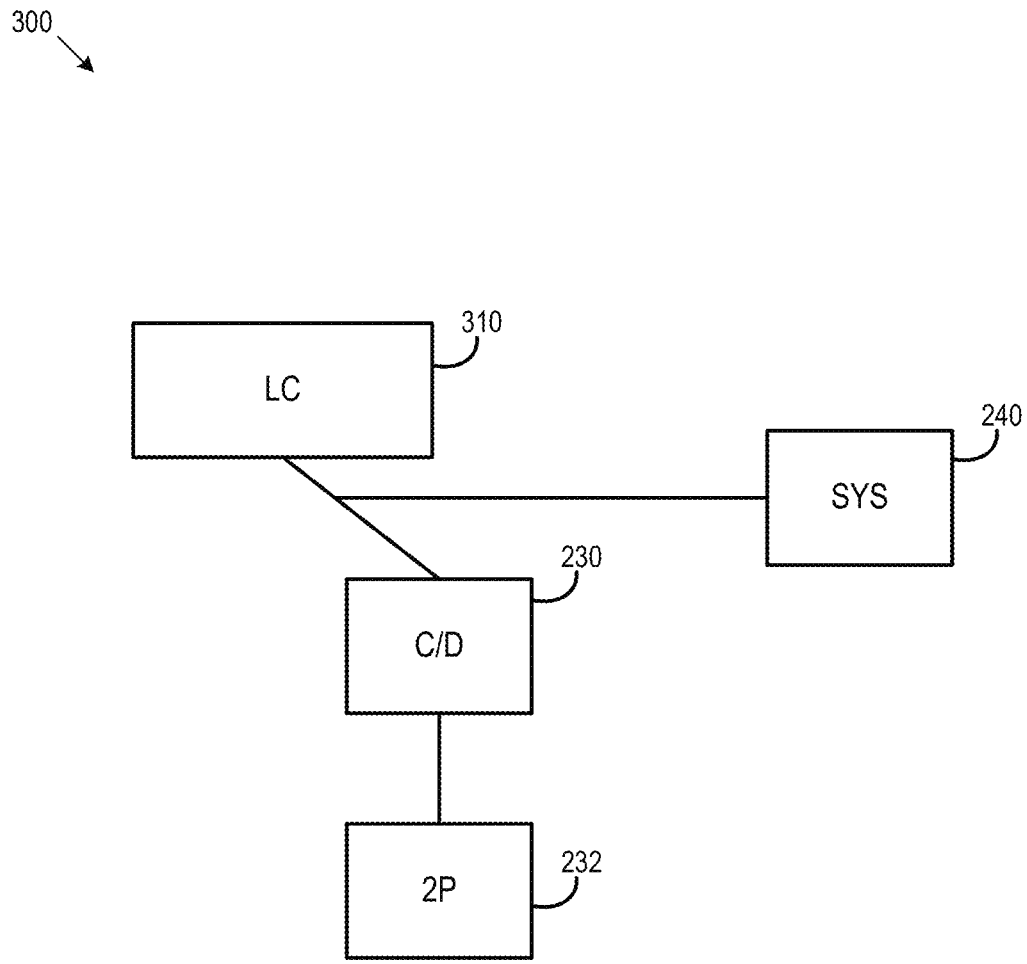
FIG. 3 shows a block diagram of an example system in accordance with some embodiments.

FIGS. 2 and 3 shows two block diagrams of two example embodiments including serial and parallel batteries respectively. FIG. 2 shows a block diagram 200 of an example system in accordance with some embodiments. The block diagram 200 shows a dual battery configuration using a serial connection of the two batteries. In block diagram 200, high voltage charger 210 provides energy to the two serially connected (2S) batteries 232 via charge and discharge path 230. With this configuration, a weak battery may stop a stronger battery from providing power to a device. In this serial operation, a 3-10% loss from the direct battery discharging path may occur, with leakage current for operating the buck to voltage power (Vdd) with a higher cycle or other operations.

FIG. 3 shows a block diagram 300 of an example system in accordance with some embodiments. The block diagram 300 shows a parallel configuration for two batteries 232 (2P) which are charged using low voltage charger 310 via charge and discharge path 230, and which provides power to system 240 and the system voltage connections (VSYS) via charge and discharge path 230. In this configuration, a weak battery of the parallel configuration 2P for two batteries 232 may stop providing power but the strong cell may continue to provide power. This configuration may have a relatively higher power consumption during a standby mode than the configuration of FIG. 2.

Table 1 below is a table showing example power-on reset, reference and supervision characteristics.

TABLE 1

| Parameter | Description | Conditions | Min | Typ | Max | Unit |
|---|---|---|---|---|---|---|
| $I_{DD\_PD}$ | Quiescent current in POWER_DOWN mode | | | 6 | | μA |
| $I_{DD\_ACT}$ | Quiescent current in ACTIVE/SLEEP mode (standalone) | PVC enabled in auto frequency mode no load VDDIO disabled | | 55 | | μA |

TABLE 1-continued

| Parameter | Description | Conditions | Min | Typ | Max | Unit |
|---|---|---|---|---|---|---|
| $I_{DD\_ACT\_MASTER}$ | Quiescent current in ACTIVE mode (master) | PVC enabled in auto frequency mode no load VDDIO disabled | | 60 | | μA |

Such characteristics may be for a wide range of operating temperatures and voltages (e.g. temperatures from −40 to 125 degrees Celsius and input voltages from 5V to 10.5V for standalone/master devices).

Circuit designs for two batteries connected serially may include an operational amplifier to monitor a discharge and charging current. When such an amplifier detects the current is out of a limit, an output of the amplifier will control additional operational amplifiers to modulate the field effect transistors (FETs) to limit the current. This may limit a current of each battery cell in order to meet a customized discharge/charge current requirement. This design may result in relatively low quiescent current by alternating between a multi-battery configuration during an operate state and a single battery configuration during a sleep state.

Figure 4:
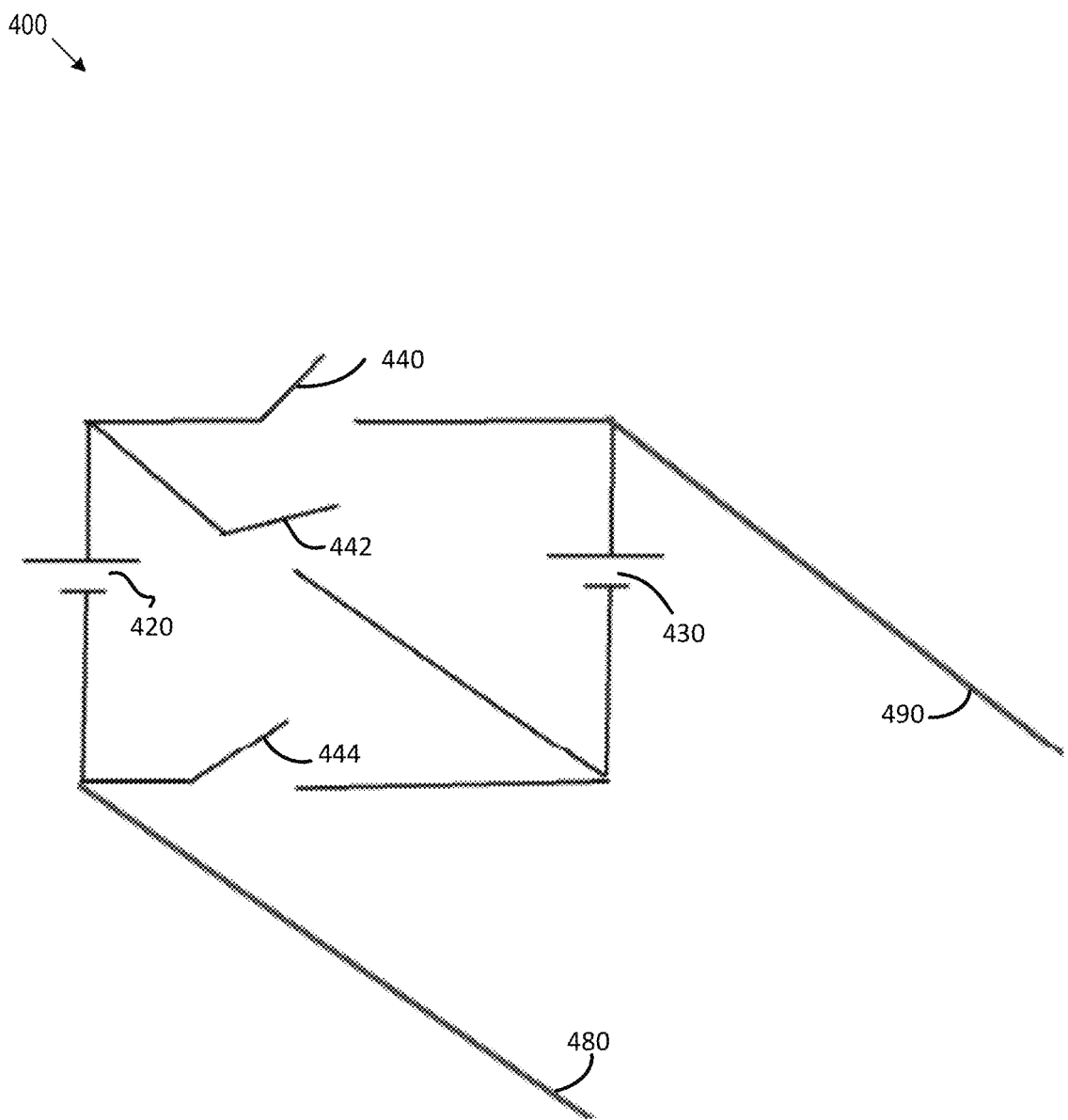
FIG. 4 is a schematic diagram of a switchable battery circuit in accordance with some embodiments.

FIG. 4 is a schematic diagram of a switchable battery circuit 400 in accordance with some embodiments. FIG. 4 includes batteries 420 and 430, switches 440, 442, and 444, and circuit paths 490 and 480. The switches enable reconfiguration of batteries 420 between serial and parallel configurations. In some embodiments, during normal time operation, the system is in serial charging and discharging, with second switch 442 closed, first switch 440 open, and third switch 444 open. During sleep operations, programmable logic controls switches 440 and 442 to confirm that a system is in standby. After this, there is a delay (e.g. deadtime) where switches 440 and 442 are both off for 10 microseconds. After that, switch 440 is on. If the lower cell is below a critical level, switch 444 is turned on, and switches 440 and 442 are turned off.

In some such embodiments, each battery has an associated protection circuitry module (PCM) and charging circuitry. FETs may be used to implement additional circuit controls (e.g. two FETs each for switches 440, 442, and 444). Such circuits may additionally include a bypass FET, a charger, and cell balancing circuitry to control the switches and bypass circuits. Some embodiments may additionally include a thermistor (NTC) for each battery. Such circuitry may be host assisted, with analog to digital circuits to monitor and indicate changes to the charger. In other embodiments, additional elements or repeated elements are included in any structure to enable operations of two or more batteries in accordance with embodiments described herein.

Figure 5:
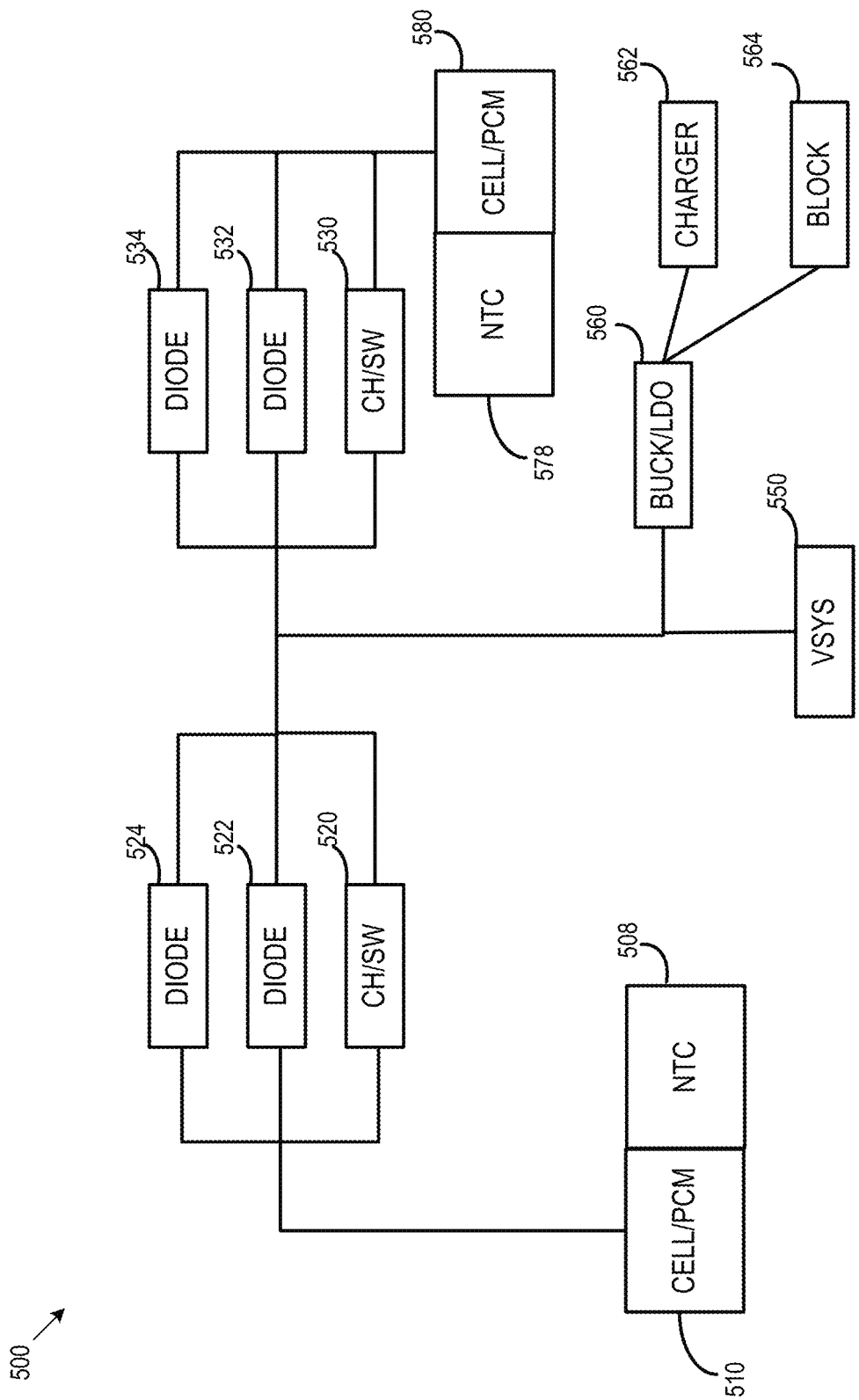
FIG. 5 is a block diagram of a design including two batteries in parallel in accordance with some embodiments.

FIG. 5 is a block diagram of a design 500 including two batteries in parallel in accordance with some embodiments. Design 500 includes first battery cell 510 with PCM and second battery cell 580 with PCM. These cells provide power to system voltage 550 and receive power via buck/LDO circuitry 560, charger(s) 562, and battery termination block 564. Each battery cell has associated temperature control circuitry shown as NTC 508 and NTC 578 for the respective illustrated battery cells. The first cell 510 is connected to the system voltage 550 via circuitry including diode 524 (e.g. a Schottky diode), diode 522 (e.g. an ideal diode configuration), and charging and load switch 520. Similarly, second cell 580 is connected to the system voltage 550 via circuitry including diode 534 (e.g. a Schottky diode), diode 532 (e.g. an ideal diode configuration), and charging and load switch 530.

The circuit design 500 shown in FIG. 5 may provide a relatively low current Iq. For example, some embodiments provide 7 microamperes (uA) (one active)+0.7 uA (one or a Schottky diode may be utilized to provide current). In some embodiments, a charger is eliminated, and in some embodiments, current limiters are used.

Figure 6:
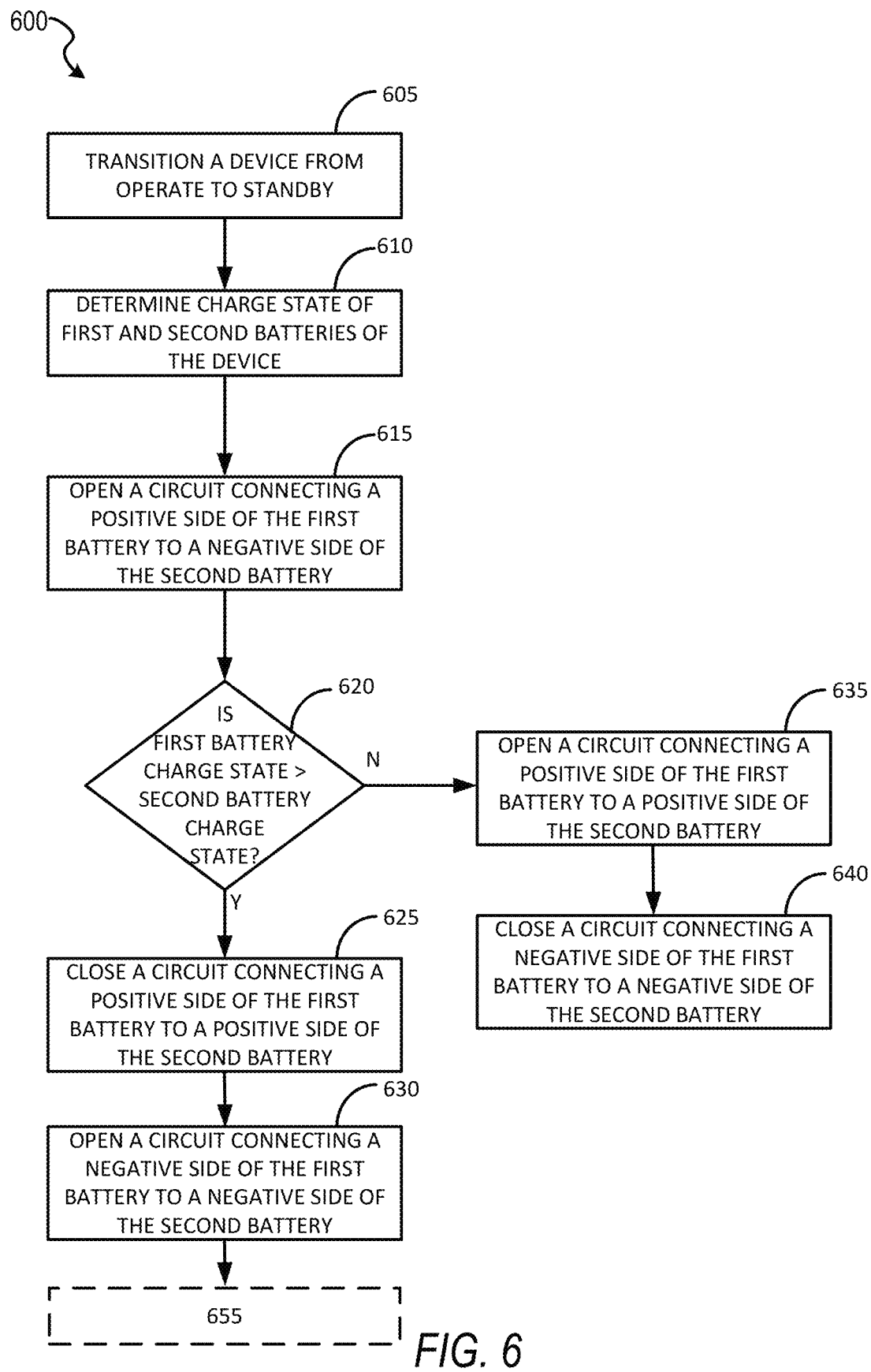
FIG. 6 is a flowchart associated with a method to manage a multi-battery power solution in accordance with some embodiments.
Figure 7:
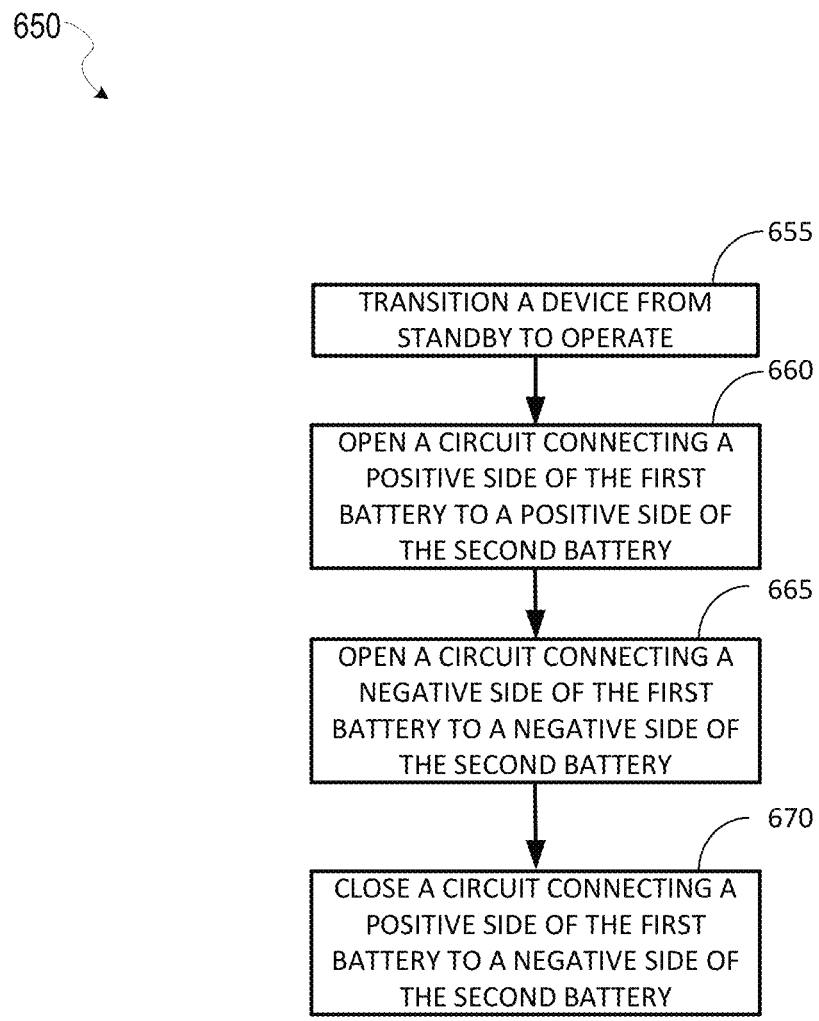
FIG. 7 is a flowchart associated with a method to manage a multi-battery power solution in accordance with some embodiments.

FIGS. 6 and 7 then show two flowcharts of two methods of controlling a device that includes two batteries in accordance with some embodiments. In some embodiments, the two methods may be combined into a single method.

FIG. 6 is a flowchart associated with a method 600 to manage a multi-battery power solution in accordance with some embodiments. In some embodiments, one or more functions discussed below with respect to FIG. 6 are performed by one or more electronic hardware processors. In some embodiments, such hardware processors are part of a wearable device configured for limited space and battery operation compared to other devices with greater battery resources. In other embodiments, any device may use such structures for efficient space design associated with power and battery systems. In some embodiments, the method 600 is implemented as a set of instructions stored in a storage medium. For example, instructions in an electronic hardware memory of a wearable device configure the one or more electronic hardware processors to perform one or more of the functions discussed below. In some embodiments, the functions described below control the switchable battery circuit, discussed above.

In block 605, a device is transitioned from an operate state to a standby state. The device may be configured to perform a first set of functionality when in the operate state. The device may be configured to perform a second set of functionality when in the standby state. In some aspects, the second set of functionality is a subset of the first set of functionality. For example, when in the operate state, the device may be configured to power a display device and/or an input device such as a keyboard. In the standby state, the device may be configured to power down the display device and/or the keyboard device. In some aspects, the transition from operate to standby is initiated by a command entered via a keyboard or other input. In some aspects, the standby state is initiated by closing a lid of a laptop device in certain aspects. Power consumption in the standby state may be reduced relative to power consumption in the operate state.

In block 610, a charge state of the first and second batteries is determined. In block 615, a circuit connecting a positive side of the first battery to a negative side of the second battery is opened.

Decision block 620 determines whether a first battery of the device has a charge state that is greater than a charge state of a second battery of the device. The charge state may indicate an absolute level of how much energy remains stored in the battery. In other aspects, the charge state represents a percentage of a maximum battery capacity that is currently utilized. If the first battery charge state is greater than the second battery charge state, method 600 moves from block 620 to block 625, which closes a circuit connecting a positive side of the first battery to a positive side of the second battery. Method 600 then moves to block 630, which opens a circuit connected a negative side of the first battery to a negative side of the second battery. In block 620, if the first battery charge state is not greater than the second battery charge state, then method 600 moves from block 620 to block 635, which opens a circuit connecting a positive side of the first battery to a positive side of the second battery. Method 600 then moves from block 635 to block 640, which closes a circuit connecting a negative side of the first battery to a negative side of the second battery.

FIG. 7 is a flowchart associated with a method 700 to manage a multi-battery power solution in accordance with some embodiments. As mentioned above, the methods and operations associated with FIG. 7 may be performed independently from the operations of FIG. 6 or may be performed together. Just as above with method 600 of FIG. 6, FIG. 7 is a flowchart associated with a method to manage a multi-battery power solution in accordance with some embodiments. In some embodiments, one or more functions discussed below with respect to FIG. 7 are performed by one or more electronic hardware processors. In some embodiments, such hardware processors are part of a wearable device configured for limited space and battery operation compared to other devices with greater battery resources. In other embodiments, any device may use such structures for efficient space design associated with power and battery systems. In some embodiments, the method 700 is implemented as a set of instructions stored in a storage medium. For example, instructions in an electronic hardware memory of a wearable device configure the one or more electronic hardware processors to perform one or more of the functions discussed below. In some embodiments, the functions described below control the switchable battery circuit, discussed above.

Method 650 begins at block 655, which transitions a device from a standby state to an operate state. In some aspects, the device is configured to perform a first set of functions in the operate state and a second set of functions in the standby state. Power consumption in the standby state may be reduced relative to power consumption in the operate state.

In block 660, a circuit connecting a positive side of the first battery to a positive side of the second battery is opened. In some aspects, this prevents utilizing the two batteries in parallel. In block 665, a circuit connecting a negative side of the first battery and the negative side of the second battery is opened. This also prevents operating the two batteries in parallel. In block 670, a circuit connecting a positive side of the first battery to a negative side of the second battery is closed. This, in part, provides for serial connection between the first and second batteries.

Figure 8:
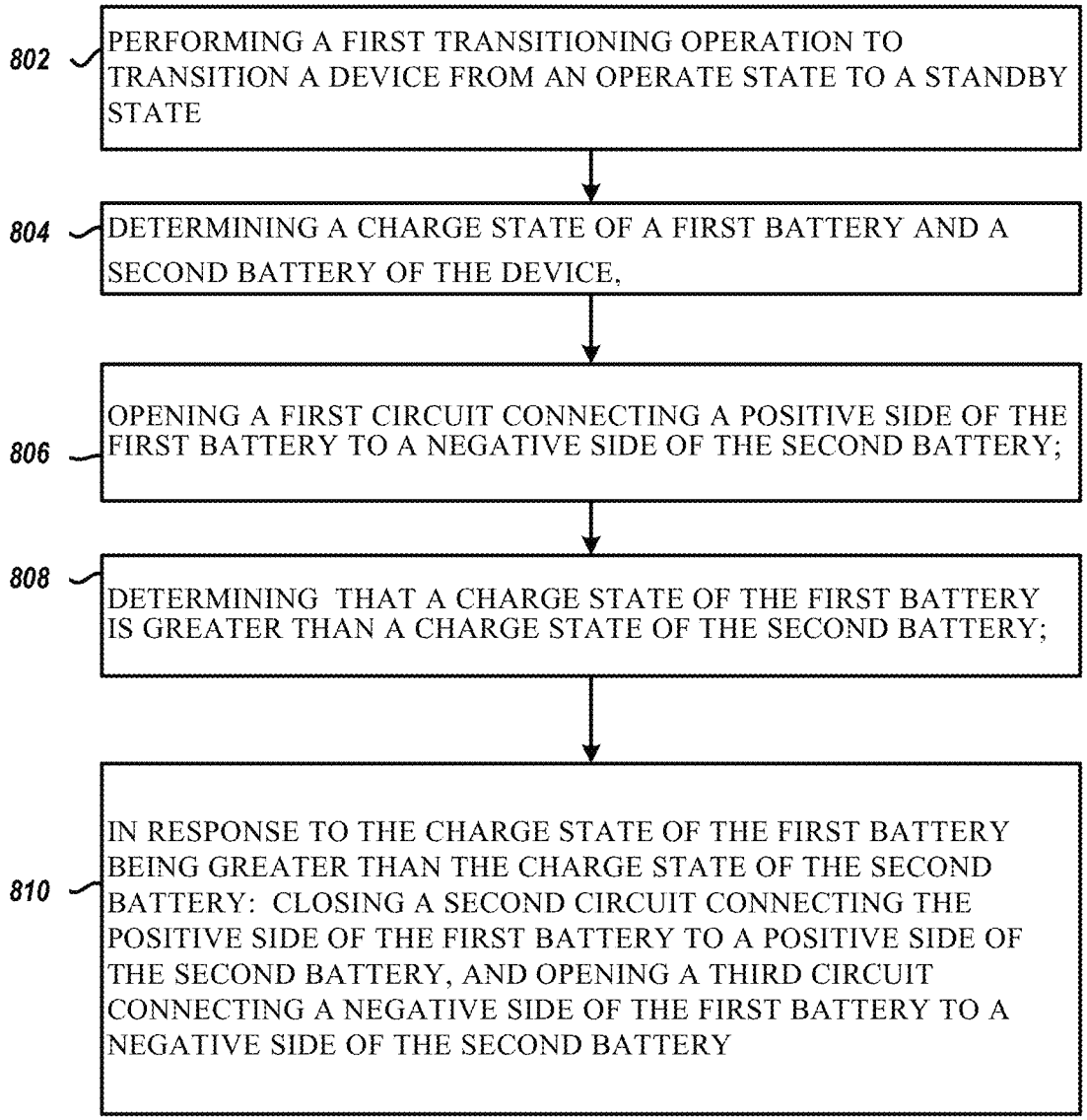
FIG. 8 describes a method in accordance with some embodiments described herein.

FIG. 8 then describes a method 800 in accordance with some embodiments described herein. In some embodiments, the method 800 is performed by a wearable device and one or more processors or control circuitry of the wearable device. In other embodiments, the method 800 is implemented as a set of instructions stored in a storage medium, where the instructions cause a wearable device to perform the method 800. In some embodiments, aspects of the method 800 are performed by a test system used for testing aspects of a wearable device.

Method 800 begins with operation 802 of performing or initiating a first transitioning operation to transition the device from an operate state to a standby state. Such a transition may be managed by processors of a control circuit independently, or may be initiated by a user input to an interface of the device or a host device (e.g. if the device is a wearable device using processing resources of a supporting device such as a computer or smartphone).

In operation 804, the device determines a charge state of a first battery and a second battery of the device. This determination is done in response to the transition in some embodiments. In other embodiments, this determination is done periodically or in response to another measurement trigger. In operation 806, a first circuit connecting a positive side of the first battery to a negative side of the second battery is opened in response to the transition or as part of the transition. Then operation 808 involves determining that a charge state of the first battery is greater than a charge state of the second battery. In operation 810, in response to the charge state of the first battery being greater than the charge state of the second battery, a number of actions are taken including closing a second circuit connecting the positive side of the first battery to a positive side of the second battery, and opening a third circuit connecting a negative side of the first battery to a negative side of the second battery.

Additional embodiments involve operations for performing a second transitioning operation to transition the device from the operate state to the standby state. In response to the second transitioning operation, the operations further involve determining a second charge state of the first battery and a second charge state of the second battery of the device, opening the first circuit connecting the positive side of the first battery to the negative side of the second battery, and determining that the second charge state of the first battery is greater than the second charge state of the second battery. Then, in response to the charge state of the first battery not being greater than the charge state of the second battery, the operations involve opening the second circuit, and closing the third circuit.

Some such embodiments may further involve transitioning the device from the standby state to the operate state, and in response to the transitioning, closing the first circuit, opening the second circuit, and opening the third circuit. In some such embodiments, opening the second circuit comprises opening a first switch, wherein a load is connected between the first switch and the positive side of the second battery. In some such embodiments, opening the third circuit comprises opening a second switch, wherein a ground is positioned between the second switch and a negative side of the first battery.

Some embodiment include a battery device, comprising a first battery, a second battery, a first circuit branch coupling a positive side of the first battery to a positive side of the second battery, a second circuit branch coupling a positive side of the first battery to a negative side of the second battery, a third circuit branch coupling the negative side of the first battery to the negative side of the second battery, a first switchable device connected to the first circuit branch and configured to control flow of current through the first circuit branch, a second switchable device connected to the second circuit branch and configured to control flow of current through the second circuit branch, and a third switchable device connected to the third circuit branch and configured to control flow of current through the third circuit branch.

Some such embodiment additionally include a power controller, with the power controller configured to open the first switchable device and the third switchable device, and close the second switchable device when the device is in a first operable state. In some such embodiments, the power controller is further configured to determine a charge state of the first and second batteries, and in response to the device entering a standby state, open the second switchable device. The device may then close the first switchable device in response to the charge state of the first battery exceeding the charge state of the second battery.

In some embodiments the power controller is further configured to determine a charge state of the first and second batteries, in response to the device entering a standby state, open the second switchable device, and close the third switchable device in response to the charge state of the second battery exceeding the charge state of the first battery.

Some such embodiments comprise a load positioned between the positive side of the second battery and the first switchable device. Some such embodiments comprise a ground positioned between the negative side of the first battery and the third switchable device. Some such embodiments operate where a cell strength of the first battery is weaker than a cell strength of the second battery. Some such embodiments further include a high voltage charger coupled to the second battery, and a low voltage charger coupled to the first battery.

It will be apparent that the above embodiments are illustrative and not strictly limiting. For example, intervening and repeated operations may be part of some embodiments. Thus, other embodiments not specifically described are possible within the scope of the present innovations.

Example Machine and Hardware Components

The example electronic devices described above may incorporate various computer components or machine elements, at least some of which are configured for performing automated operations and/or for automatically providing various functionalities. A device with a multi-battery system may thus provide an independent computer system. Instead, or in addition, such a device may form part of a distributed system including one or more off-board processors and/or devices.

Figure 9:
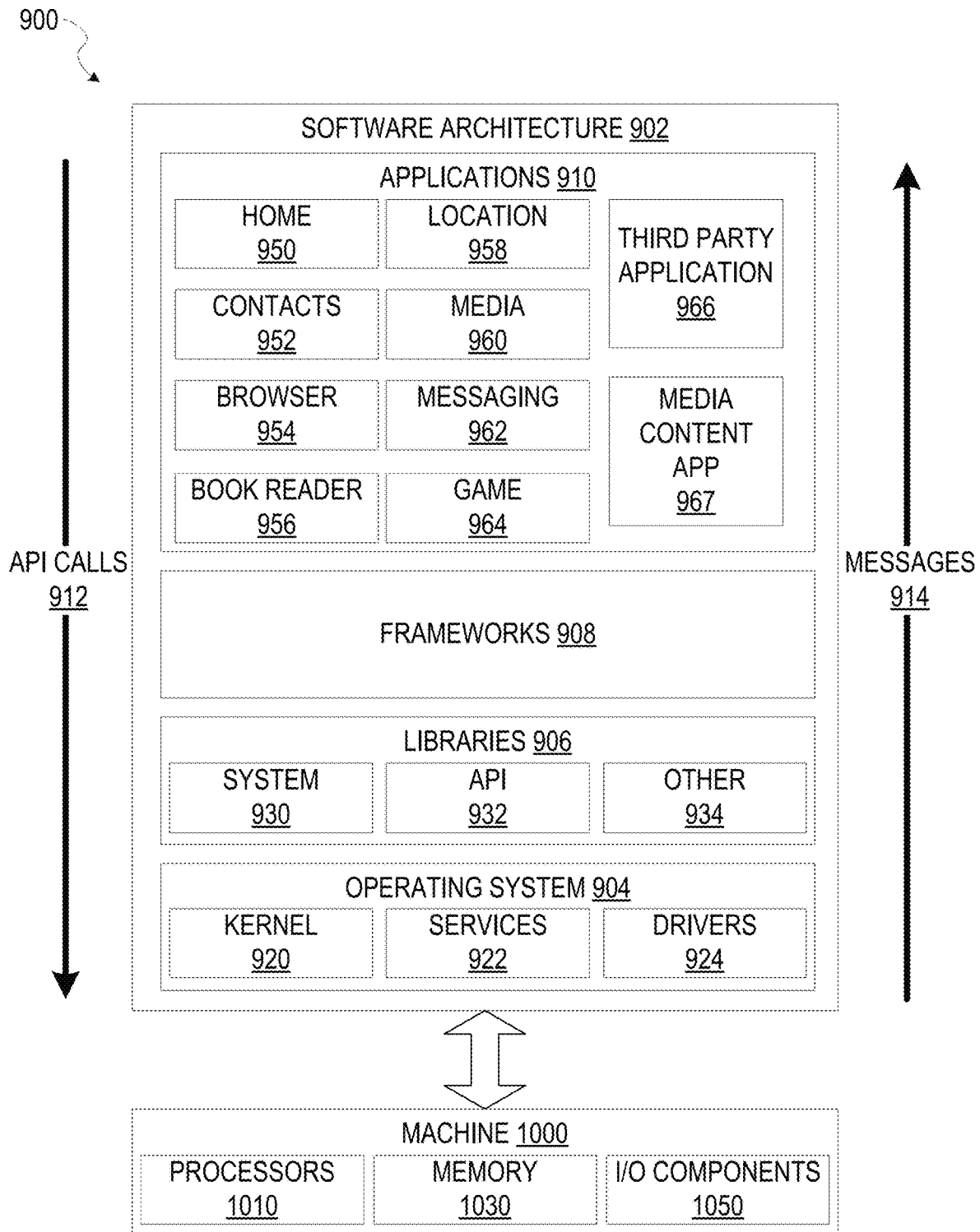
FIG. 9 is a block diagram illustrating an example of a software architecture that may be installed on a machine and used with devices and methods described in accordance with some example embodiments.

FIG. 9 is a block diagram 900 illustrating an architecture of software 902, which can be installed on any one or more of the devices described above. FIG. 9 is merely a non-limiting example of a software architecture, and it will be appreciated that many other architectures can be implemented to facilitate the functionality described herein. In various embodiments, the software 902 is implemented by hardware such as a machine 1000 of FIG. 10 that includes processors 1010, memory 1030, and I/O components 1050. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke application programming interface (API) calls 912 through the software stack and receive messages 914 in response to the API calls 912, consistent with some embodiments. In various embodiments, any client device, server computer of a server system, or other device described herein may operate using elements of the software 902. Devices such as the camera controller 104 and other components of the portable electronic devices, as described earlier, may additionally be implemented using aspects of the software 902.

In various implementations, the operating system 904 manages hardware resources and provides common services. The operating system 904 includes, for example, a kernel 920, services 922, and drivers 924. The kernel 920 acts as an abstraction layer between the hardware and the other software layers consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth. In certain implementations of a wearable device may operate using drivers 924 that only contain BLUETOOTH® Low Energy drivers and basic logic for managing communications and controlling other devices, with other drivers operating with high-speed circuitry.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third-party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third-party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or other mobile operating systems. In this example, the third-party application 966 can invoke the API calls 912 provided by the operating system 904 to facilitate functionality described herein.

Embodiments described herein may particularly interact with a media content application 967. Such a media content application 967 may interact with the I/O components 1050 to establish various wireless connections with the described devices.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an ASIC. A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). In certain embodiments, for example, a client device may relay or operate in communication with cloud computing systems, and may store media content such as images or videos generated by devices described herein in a cloud environment.

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Figure 10:
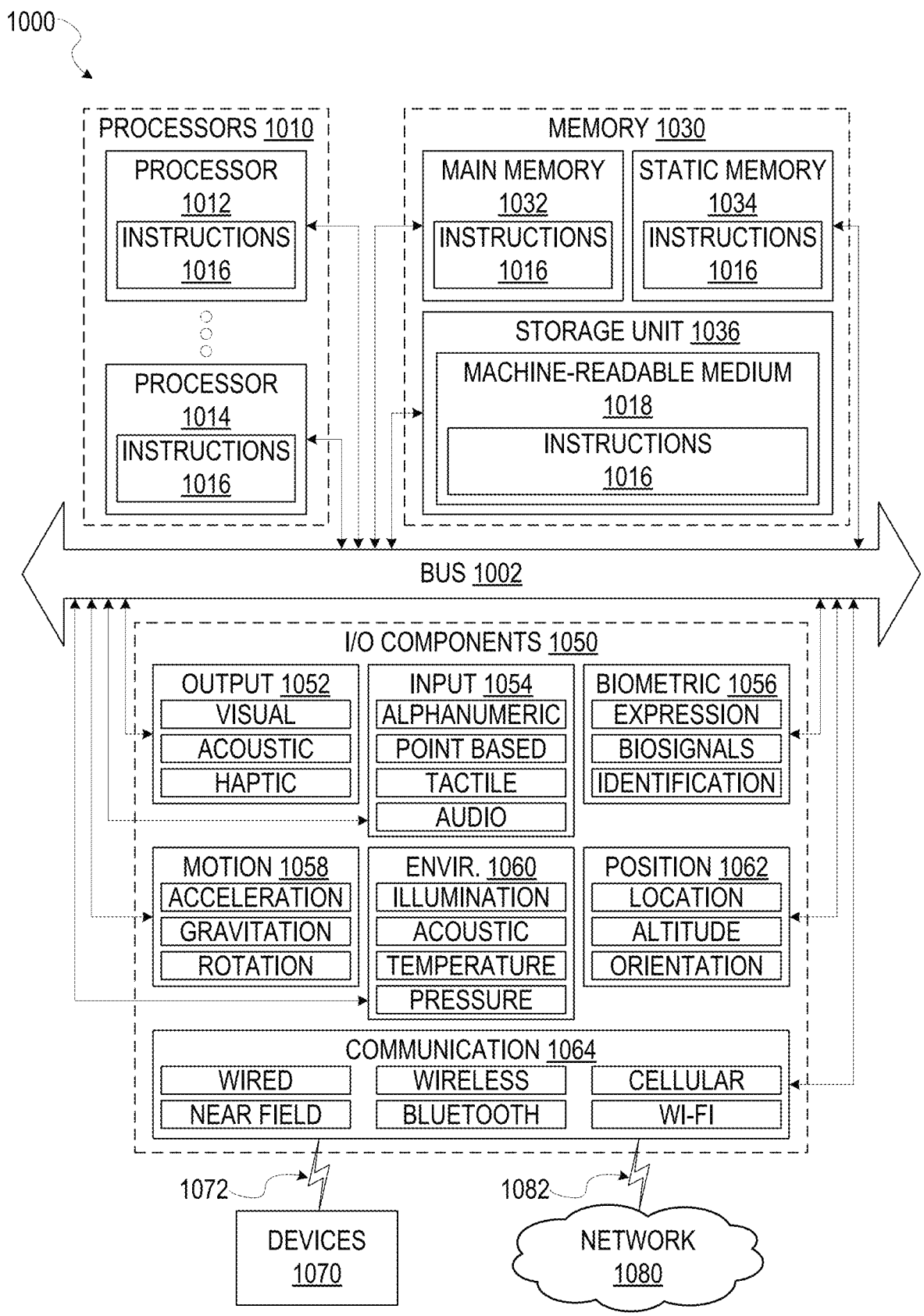
FIG. 10 illustrates a diagrammatic representation of a machine in the form of a computer system within which a set of instructions may be executed for causing the machine to perform any one or more of the methodologies discussed herein, according to some example embodiments.

FIG. 10 is a block diagram illustrating components of a machine 1000, according to some embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein can be executed. In alternative embodiments, the machine 1000 operates as a standalone device or can be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

In various embodiments, the machine 1000 comprises processors 1010, memory 1030, and I/O components 1050, which can be configured to communicate with each other via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) include, for example, a processor 1012 and a processor 1014 that may execute the instructions 1016. The term "processor" is intended to include multi-core processors that may comprise two or more independent processors (also referred to as "cores") that can execute instructions contemporaneously. Although FIG. 10 shows multiple processors 1010, the machine 1000 may include a single processor with a single core, a single processor with multiple cores (e.g., a multi-core processor), multiple processors with a single core, multiple processors with multiple cores, or any combination thereof.

The memory 1030 comprises a main memory 1032, a static memory 1034, and a storage unit 1036 accessible to the processors 1010 via the bus 1002, according to some embodiments. The storage unit 1036 can include a machine-readable medium on which are stored the instructions 1016 embodying any one or more of the methodologies or functions described herein. The instructions 1016 can also reside, completely or at least partially, within the main memory 1032, within the static memory 1034, within at least one of the processors 1010 (e.g., within the processor's cache memory), or any suitable combination thereof, during execution thereof by the machine 1000. Accordingly, in various embodiments, the main memory 1032, the static memory 1034, and the processors 1010 are considered machine-readable media.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium is shown in an example embodiment to be a single medium, the term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., the instructions 1016) for execution by a machine (e.g., the machine 1000), such that the instructions, when executed by one or more processors of the machine (e.g., the processors 1010), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read- Only Memory (EPROM)), or any suitable combination thereof. The term "machine-readable medium" specifically excludes non-statutory signals per se.

The I/O components 1050 include a wide variety of components to receive input, provide output, produce output, transmit information, exchange information, capture measurements, and so on. In general, it will be appreciated that the I/O components 1050 can include many other components that are not shown in FIG. 10. The I/O components 1050 are grouped according to functionality merely for simplifying the following discussion, and the grouping is in no way limiting. In various example embodiments, the I/O components 1050 include output components 1052 and input components 1054. The output components 1052 include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1050 include biometric components 1056, motion components 1058, environmental components 1060, or position components 1062, among a wide array of other components. For example, the biometric components 1056 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 include acceleration sensor components (e.g., accelerometer), gravitation sensor components, rotation sensor components (e.g., gyroscope), and so forth. The environmental components 1060 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or another suitable device to interface with the network 1080. In further examples, the communication components 1064 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1070 may be another machine or any of a wide variety of peripheral devices (e.g., a peripheral device coupled via a USB).

Moreover, in some embodiments, the communication components 1064 detect identifiers or include components operable to detect identifiers. For example, the communication components 1064 include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1064, such as location via Internet Protocol (IP) geo-location, location via WI-FI® signal triangulation, location via detecting an BLUETOOTH® or NFC beacon signal that may indicate a particular location, and so forth.

In various example embodiments, one or more portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

In example embodiments, the instructions 1016 are transmitted or received over the network 1080 using a transmission medium via a network interface device (e.g., a network interface component included in the communication components 1064) and utilizing any one of a number of well-known transfer protocols (e.g., HTTP). Similarly, in other example embodiments, the instructions 1016 are transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Furthermore, the machine-readable medium is non-transitory (in other words, not having any transitory signals) in that it does not embody a propagating signal. However, labeling the machine-readable medium "non-transitory" should not be construed to mean that the medium is incapable of movement; the medium should be considered as being transportable from one physical location to another. Additionally, since the machine-readable medium is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Where a phrase similar to "at least one of A, B, or C," "at least one of A, B, and C," "one or more of A, B, or C," or "one or more of A, B, and C" is used, it is intended that the phrase be interpreted to mean that A alone may be present in an embodiment, B alone may be present in an embodiment, C alone may be present in an embodiment, or any combination of the elements A, B, and C may be present in a single embodiment; for example, A and B, A and C, B and C, or A and B and C may be present.

Changes and modifications may be made to the disclosed embodiments without departing from the scope of the present disclosure. These and other changes or modifications are intended to be included within the scope of the present disclosure, as expressed in the following claims.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

I claim:

1. An apparatus of a battery device, comprising:
   a first switchable device connected to a first circuit pathway and configured to control flow of current through the first circuit pathway coupling a positive side of a first battery to a positive side of a second battery;
   a second switchable device connected to a second circuit pathway and configured to control flow of current through the second circuit pathway coupling a positive side of the first battery to a negative side of the second battery; and
   a third switchable device connected to a third circuit pathway and configured to control flow of current through the third circuit pathway coupling the negative side of the first battery to the negative side of the second battery;
   processing circuitry configured to:
   in response to a first signal, open the first switchable device, open the third switchable device, and close the second switchable device; and
   in response to a second signal, open the second switchable device, and close the third switchable device.

2. The apparatus of claim 1, wherein the response to the second signal further comprises open the first switchable device.

3. The apparatus of claim 1, wherein the processing circuitry is further configured to:
   in response to a third signal, close the first switchable device, open the second switchable device, and open the third switchable device.

4. The apparatus of claim 3, wherein the processing circuitry is further configured to:
   generate the second signal in response to a determination that the first battery has a weaker cell strength than the second battery; and
   generate the third signal in response to a determination that the second battery has a weaker call strength than the first battery.

5. The apparatus of claim 3, wherein the third signal indicates a standby configuration with the second battery having a strong cell strength than the first battery.

6. The apparatus of claim 3, wherein the processing circuitry is further configured to:
charge the first battery in response to the second signal; and
charge the second battery in response to the third signal.

7. The apparatus of claim 1, wherein the first signal indicates a load configuration.

8. The apparatus of claim 7, further comprising a load positioned between the positive side of the second battery and the first switchable device.

9. The apparatus of claim 1, wherein the second signal indicates a stand-by configuration with the first battery having a stronger cell strength than the second battery.

10. The apparatus of claim 1, further comprising a high voltage charger coupled to the second battery, and a low voltage charger coupled to the first battery.

11. A non-transitory computer readable medium comprising instructions that, when executed by one or more processors of a device, cause the device to perform operations comprising:
in response to a first signal, open a first switchable device, open a third switchable device, and close a second switchable device, wherein the first switchable device is connected to a first circuit pathway and is configured to control flow of current through the first circuit pathway coupling a positive side of a first battery to a positive side of a second battery, the second switchable device is connected to a second circuit pathway and is configured to control flow of current through the second circuit pathway coupling a positive side of the first battery to a negative side of the second battery, and the third switchable device is connected to a third circuit pathway and is configured to control flow of current through the third circuit pathway coupling the negative side of the first battery to the negative side of the second battery; and
in response to a second signal, open the second switchable device, and close the third switchable device.

12. The non-transitory computer readable medium of claim 11, wherein the response to the second signal further comprises open the first switchable device.

13. The non-transitory computer readable medium of claim 11, wherein the operations further comprise:
in response to a third signal, close the first switchable device, open the second switchable device, and open the third switchable device.

14. The non-transitory computer readable medium of claim 13, wherein the operations further comprise:
generate the second signal in response to a determination that the first battery has a weaker cell strength than the second battery; and
generate the third signal in response to a determination that the second battery has a weaker call strength than the first battery.

15. The non-transitory computer readable medium of claim 13, wherein the third signal indicates a standby configuration with the second battery having a strong cell strength than the first battery.

16. The non-transitory computer readable medium of claim 13, wherein the operations further comprise:
charge the first battery in response to the second signal; and
charge the second battery in response to the third signal.

17. The non-transitory computer readable medium of claim 11, wherein the first signal indicates a load configuration.

18. The non-transitory computer readable medium of claim 17, further comprising a load positioned between the positive side of the second battery and the first switchable device.

19. The non-transitory computer readable medium of claim 11, wherein the second signal indicates a stand-by configuration with the first battery having a stronger cell strength than the second battery.

20. A method comprising:
in response to a first signal, opening a first switchable device, opening a third switchable device, and closing a second switchable device, wherein the first switchable device is connected to a first circuit pathway and is configured to control flow of current through the first circuit pathway coupling a positive side of a first battery to a positive side of a second battery, the second switchable device is connected to a second circuit pathway and is configured to control flow of current through the second circuit pathway coupling a positive side of the first battery to a negative side of the second battery, and the third switchable device is connected to a third circuit pathway and is configured to control flow of current through the third circuit pathway coupling the negative side of the first battery to the negative side of the second battery;
in response to a second signal, opening the second switchable device, and close the third switchable device; and
in response to a third signal, closing the first switchable device, opening the second switchable device, and opening the third switchable device.

* * * * *